Figure 1:
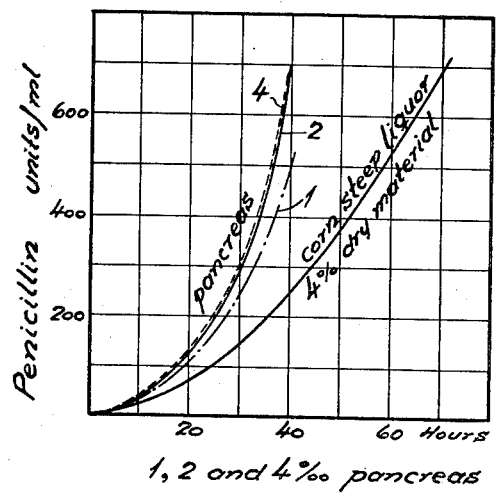

Dec. 28, 1954  H. M. CHRISTENSEN  2,698,274
PROCESS FOR THE PRODUCTION OF PENICILLIN
Filed April 24, 1951

1, 2 and 4‰ pancreas 1, 2 and 4‰ stomach 1, 2 and 4‰ intestine

Henry Marinus Christensen
INVENTOR

By Richardson, David and Nordin his Attys.

2,698,274

PROCESS FOR THE PRODUCTION OF PENICILLIN

Henry Marinus Christensen, Roskilde, Denmark

Application April 24, 1951, Serial No. 222,563

12 Claims. (Cl. 195—36)

The present application is a continuation-in-part of U. S. application Serial No. 790,236 filed December 6, 1947, by the same applicant and now abandoned.

My invention relates to a process for the production of penicillin by growing strains of molds capable of producing the said substance, in or on a suitable nutrient medium.

One object of my invention is to accelerate the growth of molds capable of producing penicillin as compared with propagation processes for such molds known in the art.

Another object of my invention is to increase the yield of penicillin per volume of nutrient medium and time of growth.

A still further object of my invention is to provide a culture medium for molds capable of producing penicillin which contains an animal protein material effective as a source of organic nitrogen and also as a growth-promoting factor for such molds.

According to the invention, these and other objects are accomplished by a process which comprises growing strains of molds capable of producing penicillin, such as *Penicillium chrysogenum* in or on an aqueous nutrient medium containing, in addition to the usual carbohydrates and nutrient salts, as a source of organic nitrogen and growth-promoting factor, a comminuted gland material of the animal digestive tract (the stomach and guts) including the pancreas.

While animal protein material in general, such as meat extracts, have been found to be of little value as source of organic nitrogen in culture media for the propagation of molds capable of producing penicillin, I have discovered that the gland material of the animal digestive tract including the pancreas produce very favorable results when used as source of organic nitrogen in culture media for such molds.

The raw gland material, which is preferable first defatted and desiccated in the usual manner, is ground and may then be degraded by any of the various procedures known in the art. A preferred method of degrading the gland material is by digestion with enzymes. For example, the material may be treated with pepsin at a pH value below 7 or with trypsin at a pH value above 7, or first with pepsin and subsequently with trypsin. Alternatively, degradation may be obtained in known manner by treatment of the protein material with strong acids or any other suitable method.

The gland material is sterilized, for instance, by filtration or heat, before it is added to the nutrient medium, or it may be sterilized together with parts or all of the nutrient medium.

Products obtained from stomach pancreas, the small intestine and the great gut of animals yield particularly favorable results. Thus, the propagation of penicillin-producing molds by submerged culture in a nutrient medium containing the usual carbohydrates and nutrient salts and, as a source of organic nitrogen, an enzymatic degradation product of animal stomach pancreas, small intestine and great gut, yield after 36–48 hours penicillin concentrations of 600 to 700 international units per milliliter of culture liquid. This is considerably in excess of any result obtained heretofore in the production of penicillin by the propagation of molds.

In the following examples different methods are mentioned for the culture of molds, but also other methods may be used e. g. the dried raw material may be used in mixture with the enzymatic degraded raw material. By this method it is possible to obtain relatively good yields, probably because of the decomposition of not degraded raw material during the growth of the mold.

Generally the culture is supplied with a precursor such as potassium phenyl acetate acid during the cultivation to obtain the most possible of penicillin G— the preferred kind.

By omitting the addition of potassium phenyl acetate acid other kinds of penicillin are produced. The total yield of penicillin products will be the same.

Example I 50 kg. of defatted and desiccated powdered gland material obtained from animal pancreas are suspended in 500 kg. of water. The suspension is adjusted to pH 2. A suitable quantity of pepsin is added and enzymatic digestion is permitted to proceed at about 40° C. for 48 hours. At the end of this period the suspension is adjusted to pH 7.5 and, after addition of a suitable quantity of trypsin, the enzymatic digestion is continued at a temperature of about 40° C. for another 72 hours. The resulting solution is adjusted to pH 6, filtered and sterilized in an autoclave. The solution is then added, for instance in the proportion of 1:50 by weight, to an aqueous solution containing about 1 to 5% by weight of carbohydrates, such as lactose or glucose, and nutrient salts. This latter solution has the following composition:

| | | |
|---|---|---|
| Lactose | percent | 3 |
| Glucose | do | 0.5 |
| NaNO₃ | do | 0.3 |
| KH₂PO₄ | do | 0.1 |
| MgSO₄, 7H₂O | do | 0.08 |
| FeSO₄, 7H₂O | do | 0.0015 |
| Rest | | Water |

In the resulting aqueous nutrient medium the degraded pancreas material constitutes the source of organic nitrogen. This medium is suitable for the growth of molds producing penicillin. The cultivation is undertaken in the usual manner in deep fermentation tanks under aeration and stirring. Potassium phenyl acetate is added to the medium at suitable intervals to a total of 2–3%. As an antifoaming agent peanut oil is used during the fermentation; the temperature is kept at 24–26°.

On the graph, Fig. 1, are indicated the results obtained by the said process, when using 1, 2 and 4% of the pancreas product in the nutrient solution in comparison with the results obtained by the ordinary process using a solution containing corn steep liquor. This solution contains 4% of the dry corn material. On the abscissa the durations of the treatments are indicated, and on the ordinate the quantities of penicillin in international units pr. ml. It emerges from the graph that when using pancreas high penicillin concentrations can be obtained within 40 hours, whereas similar results can be obtained by means of corn steep liquor only in the course of 70 hours.

The graph dates from the start of the carrying out of the present process wherefore the penicillin yields by this process are relatively small.

Example II 50 kg. of defatted and desiccated powdered material obtained from animal stomachs is suspended in 500 kg. of water. The suspension is adjusted to pH 2. A suitable quantity of pespin is added and enzymatic digestion is performed at about 40° for 24 hours. The resulting solution is added for instance in the proportion of 1:50 or more by weight to an aqueous solution containing about 1 to 5% by weight of carbohydrates, such as lactose or glucose, and nutrient salts. This latter solution is of the same composition as said in Example I.

In the resulting aqueous medium, in which the degraded stomach material constitutes the source of organic nitrogen. This medium is a suitable culture medium for the growth of molds producing penicillin. The cultivation is performed in the usual manner in deep fermentation tanks under aeration and stirring. Potassium phenylacetate is added at suitable intervals to a total of about 3%. As an antifoaming agent peanut oil is used. The temperature is kept at 24–26° during the fermentation.

Figure 2:
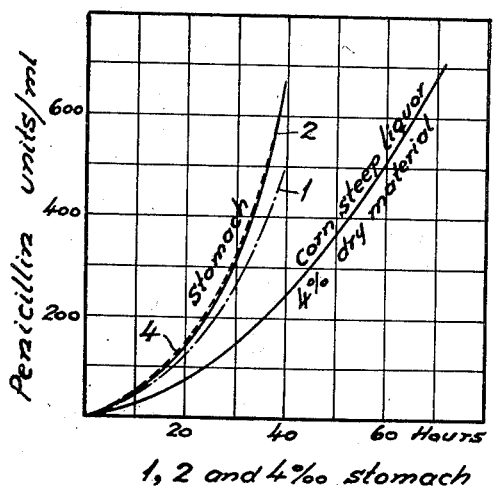

On the graph, Fig. 2, are indicated the results obtained by the said process in the same way as mentioned under Example I. The results obtained by using the stomach are quite as good as the results obtained when using pancreas.

*Example III*

50 kg. of defatted desiccated powdered material obtained from animal intestines is suspended in 500 kg. of water. The suspension is adjusted to pH 2. A suitable quantity of pepsin is added and enzymatic digestion is performed at about 40° C. for 24 hours. The resulting solution is added for instance in a proportion of 1:50 or more by weight to an aqueous solution containing about 1 to 5% by weight of carbohydrates, such as lactose or glucose, and nutrient salts. This latter solution is of the same composition as that stated in Example I. In the resulting aqueous nutrient medium in which the degraded intestine material constitutes the source of organic nitrogen is a suitable culture medium for the growth of molds producing penicillin according to the invention. The cultivation is performed in the usual manner in deep fermentation tanks under aeration and stirring. Potassium phenyl acetate is added at suitable intervals to a total of 2-3%. As an antifoaming agent peanut oil is used. The temperature is kept at 24-26° C. during the fermentation.

Figure 3:
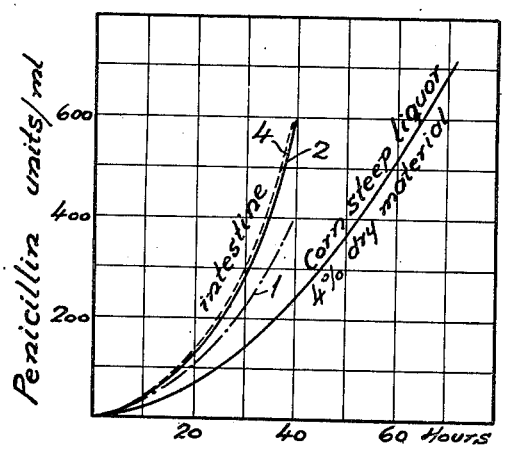

On the graph, Fig. 3, are indicated the yields obtained by the said process in the same way as indicated in Example I. Intestines also rapidly give good results but not quite as high a penicillin concentration as the pancreas and stomach.

*Example IV*

50 kg. of defatted and desiccated powdered materials obtained from animal pancreas, stomach and intestines are suspended in 500 kg. of water. The suspension is adjusted to pH 2. A suitable quantity of pepsin is added and enzymatic digestion is performed at about 40° C. for 24 hours. The resulting solution is added for instance in a proportion of 1:50 or more by weight to an aqueous solution containing about 1 to 5% by weight of carbohydrates, such as lactose or glucose, and nutrient salts. This latter solution is of the same composition as that stated in Example I. The resulting aqueous nutrient medium in which the degraded pancreas, stomach and intestinal material constitutes the source of organic nitrogen is a suitable culture medium for the growth of molds producing penicillin according to the invention. The cultivation is performed in the usual manner in deep fermentation tanks under aeration and stirring. Potassium phenyl acetate is added at suitable intervals to a total of 2-3%. As an antifoaming agent peanut oil is used. The temperature is kept at 24-26° during the fermentation.

The yields obtained are essentially the same as indicated in Examples I and II.

*Example V*

50 kg. of defatted and desiccated powdered gland material obtained from animal pancreas, stomach and intestines are suspended in 500 kg. of water. The suspension is adjusted to pH 2. A suitable quantity of pepsin is added and enzymatic digestion is permitted to proceed at about 40° C. for 48 hours. At the end of this period the suspension is adjusted to pH 7.5 and, after addition of a suitable quantity of trypsin, the enzymatic digestion is continued at a temperature of about 40° C. for another 72 hours. The resulting solution is adjusted to pH 6. It is then added, for instance in the proportion of 1:50 by weight to an aqueous solution containing about 1 to 5% by weight of carbohydrates, such as lactose or glucose, and nutrient salts. This latter solution has the same composition as that stated in Example I. The resulting aqueous medium in which the degraded pancreas, stomach and intestinal material constitutes the source of organic nitrogen is a suitable culture medium for the growth of molds producing penicillin according to the invention. The cultivation is undertaken in the usual manner in deep fermenation tanks under aeration and stirring. Potassium phenyl acetate is added at suitable intervals to a total of 2-3%. As an antifoaming agent peanut oil is used. The temperature is kept at 24-26° during the fermentation.

The yields obtained are essentially the same as those given in Examples I and II.

*Example VI*

50 kg. of defatted and desiccated powdered material from animal pancreas and stomach is suspended in 500 kg. of tap water. The suspension is added for instance in the proportion 1:50 by weight to an aqueous solution containing about 1 to 5% by weight of carbohydrates, such as lactose or glucose, and nutrient salts. This latter solution has the same composition as that stated in Example I. The resulting aqueous medium in which the degraded pancreas and stomach material constitutes the source of organic nitrogen is a suitable culture medium for the growth of molds producing penicillin according to the invention. The cultivation is undertaken in the usual manner in deep fermentation tanks under aeration and stirring. Potassium phenyl acetate is added at suitable intervals to a total of 2-3%. As an antifoaming agent peanut oil is used. The temperature is kept at 24-26° during the fermentation.

The yields obtained are generally not quite as high as those of Examples I and II and the cultivation may last somewhat longer.

*Example VII*

Fresh ground pancreas and stomach is added in the proportion of 7:50 to an aqueous solution containing about 1-5% by weight of carbohydrates, such as lactose or glucose, and nutrient salts. This latter solution has the same composition as that stated in Example I. The resulting aqueous medium in which the degraded pancreas and stomach material constitutes the source of organic nitrogen is a suitable culture medium for the growth of molds producing penicillin according to the invention. The cultivation is undertaken in the usual manner in deep fermentation tanks under aeration and stirring. Potassium phenyl acetate is added at suitable intervals to a total of 2-3%. As an antifoaming agent peanut oil is used. The temperature is kept at 24-26° during the fermentation.

The yields obtained are not as high as those obtained according to Examples I, II and III and the process proceeds more slowly. As moreover the raw material is difficult to store and often may be infected this method is only usable in special cases.

*Example VIII*

50 kg. of defatted and desiccated powdered material obtained from animal pancreas, stomach and intestines is soaked in 350 litres of 3 N sulphuric acid and boiled for 6-7 hours. The mixture is then neutralized by the addition of calcium oxide to pH 6. Water is added to 500 litres.

The resulting solution is added for instance in the proportion 1:50 to an aqueous solution containing about 1 to 5% by weight of carbohydrates, such as lactose or glucose, and nutrient salts. This latter solution has the same composition as that stated in Example I. The resulting aqueous medium in which the degraded pancreas, stomach and intestinal material constitutes the source of organic nitrogen is a suitable culture medium for the growth of molds producing penicillin according to the invention. The cultivation is undertaken in the usual manner in deep fermentation tanks under aeration and stirring. Potassium phenyl acetate is added at suitable intervals to a total of 2-3%. As an antifoaming agent pea-nut oil is used. The temperature is kept at 24-26° during the fermentation.

Also by this method good yields are obtained in a short time.

Having now particularly described and ascertained the nature of my said invention and in what manner the same is to be performed, I declare that what I claim is:

1. In the method for the production of penicillin, which method involves submerged fermentation by *Penicillium chrysogenum* in an aqueous nutrient medium, the improvement which comprises the addition to said aqueous medium of a finely comminuted animal glandular ingredient selected from the group including the stomach and intestinal portions of the digestive tract and pancreas of said animal.

2. The improvement according to claim 1, in which the concentration of said granular ingredient in said aqueous solution is in the range from 0.1% to 2.0%.

3. The improvement according to claim 1, in which said animal ingredient consists of the stomach of said animal.

4. The improvement according to claim 1, in which said animal ingredient consists of the pancreas of said animal.

5. The improvement according to claim 1, in which said animal ingredient consists of the small intestine of said animal.

6. The improvement according to claim 1, in which said grandular ingredient is defatted and dessicated.

7. The improvement according to claim 1, in which said glandular ingredient is transformed into a degradation product prior to the addition thereof to said nutrient solution.

8. The improvement according to claim 7, wherein enzymes are utilized to produce said degradation.

9. A method of growing *Penicillium chrysogenum*, including the steps of finely comminuting a gland-carrying part of the animal digestive tract, chosen from the group consisting of pancreas, stomach and small intestine, defatting and desiccating said part, then enzymatically degrading said part, adding said so-treated part to a nutrient medium including carbohydrates, mineral salts and potassium phenyl acetate as a precursor, in the proportion of between 0.1% and 2.0% of part, computed by weight upon an anhydrous basis, relative to the weight of said nutrient medium, and incubating and growing said *Penicillium chrysogenum* by submerged fermentation in said composite nutrient medium.

10. A method according to claim 9, wherein said part is pancreas.

11. A method according to claim 9, wherein said part is stomach.

12. A method according to claim 9, wherein said part is small intestine.

References Cited in the file of this patent

UNITED STATES PATENTS

| Number | Name | Date |
|---|---|---|
| 2,132,167 | Huber et al. | Oct. 4, 1938 |
| 2,285,708 | Glynn | June 9, 1942 |
| 2,400,710 | Piersma | May 21, 1946 |
| 2,442,141 | Moyer | May 25, 1948 |
| 2,476,107 | Moyer | July 12, 1949 |

OTHER REFERENCES

Vera, "Journal Bacteriology", Jan. 1944, page 59.

Halpern "Science", vol. 102, Aug. 31, 1945, pages 230–231.

Abraham et al. "The Lancet", Aug. 16, 1941 page 177.